United States Patent
Broese et al.

(10) Patent No.: US 7,085,619 B2
(45) Date of Patent: Aug. 1, 2006

(54) METHOD FOR CONTROLLING AN INDUSTRIAL PROCESS

(75) Inventors: Einar Broese, Heroldsberg (DE); Klaus Weinzieri, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/503,276

(22) PCT Filed: Jan. 16, 2003

(86) PCT No.: PCT/DE03/00111

§ 371 (c)(1),
(2), (4) Date: Jul. 29, 2004

(87) PCT Pub. No.: WO03/065134

PCT Pub. Date: Aug. 7, 2003

(65) Prior Publication Data

US 2005/0131572 A1   Jun. 16, 2005

(30) Foreign Application Priority Data

Jan. 31, 2002  (DE) .............................. 102 03 787

(51) Int. Cl.
  *G06F 19/00*  (2006.01)
  *G05B 13/04*  (2006.01)
(52) U.S. Cl. .................. 700/164; 700/30; 700/108
(58) Field of Classification Search ........ 700/148–156, 700/30, 31, 29, 108; 72/9.4, 10.4, 201; 148/511; 266/87, 113
See application file for complete search history.

(56) References Cited

U.S. PATENT DOCUMENTS

| | | | |
|---|---|---|---|
| 3,631,697 A * | 1/1972 | Deramo et al. | ............... 72/10.4 |
| 6,185,970 B1 | 2/2001 | Latzel | |
| 6,225,609 B1 | 5/2001 | Imanari et al. | |
| 6,430,461 B1 | 8/2002 | Andorfer et al. | |
| 6,866,729 B1 * | 3/2005 | Gramckow et al. | ......... 148/511 |
| 2003/0089431 A1 | 5/2003 | Gramckow et al. | |

FOREIGN PATENT DOCUMENTS

| | | |
|---|---|---|
| DE | 40 40 360 A1 | 6/1991 |
| EP | 0 756 219 B1 | 1/1997 |
| WO | WO 01/47648 * | 7/2001 |

* cited by examiner

*Primary Examiner*—Leo Picard
*Assistant Examiner*—Steven R. Garland

(57) ABSTRACT

The invention relates to a method for controlling an industrial process for manufacturing or processing a product, in particular for controlling the cooling line of a hot-rolling mill, said cooling line being simulated by a physical model. To optimize the cooling process, a correction factor is determined in a simple manner, whereby the product data records are saved with the correction factors that have been determined previously. For a new strip to be cooled, the saved product data records are compared with the product data of the new strip and similar data records are extracted. A new correction factor is then determined, e.g. by means of linear regression, from the correction factors of the similar product data records.

16 Claims, 7 Drawing Sheets

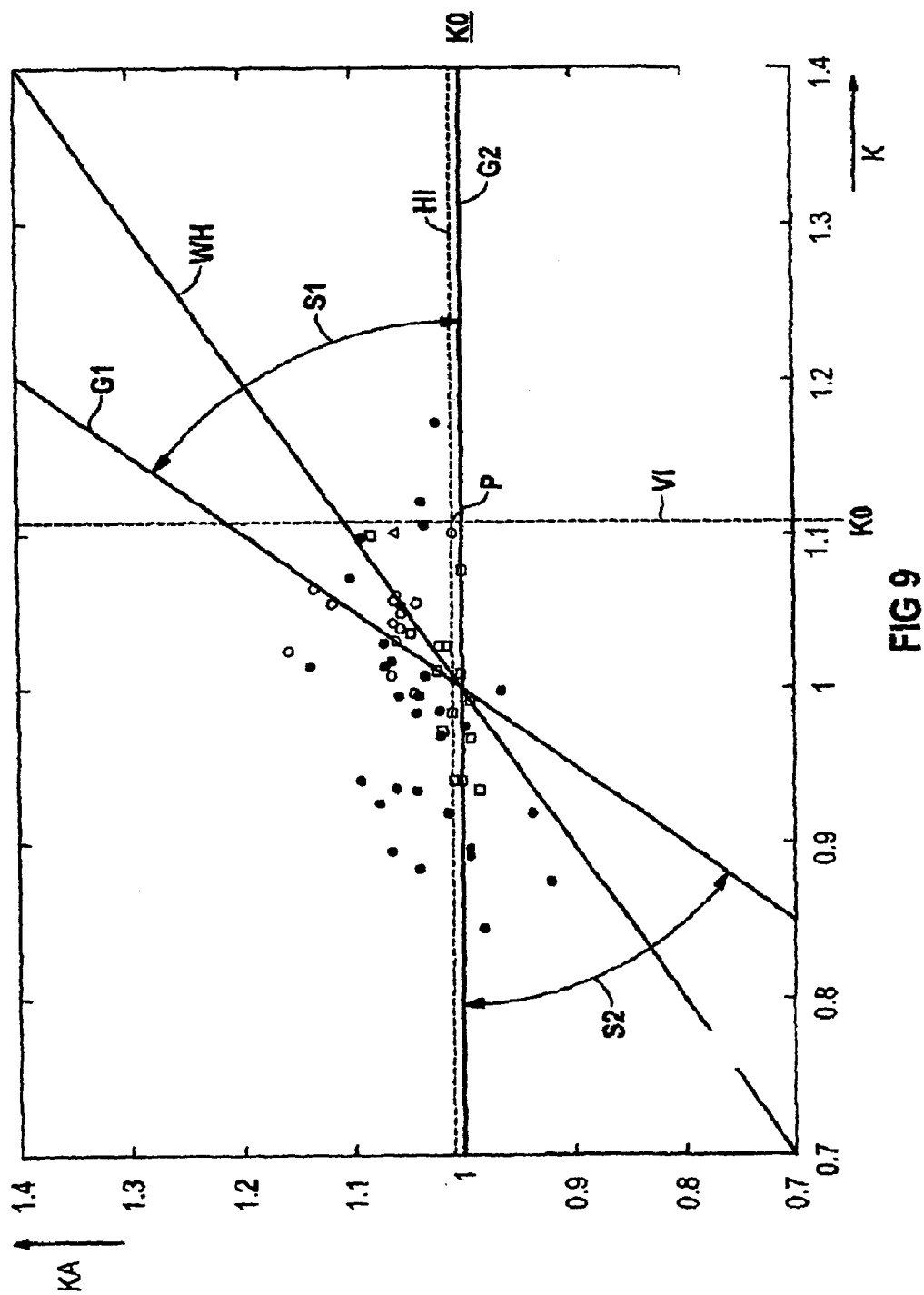

METHOD FOR CONTROLLING AN INDUSTRIAL PROCESS

CROSS REFERENCE TO RELATED APPLICATIONS

This application is the US National Stage of International Application No. PCT/DE03/00111, filed Jan. 16, 2003 and claims the benefit thereof. The International Application claims the benefits of German application No. 10203787.6 filed Jan. 31, 2002, both of the applications are incorporated by reference herein in their entirety.

FIELD OF INVENTION

The invention relates to a method for controlling an industrial process for manufacturing or processing a product, in particular for controlling the cooling line of a hot-rolling mill.

BACKGROUND OF INVENTION

In accordance with the conventional method the open and closed-loop controlling of industrial processes is based on a physical model designed to emulate the real industrial process. For the open-loop control of the cooling line of a hot-rolling mill the physical model should reflect as accurately as possible the reality of the overall cooling process. However there are now effects which are not accessible for precise model building since they are heavily system-specific or the effort required to describe them is not worthwhile. One example which might be cited here is the influence of the steel surface properties on the heat transfer.

To achieve model building which reflects reality as accurately as possible, the physical model is thus expanded by a statistical model which utilizes the available correlations of the widest variety of influencing factors with the model error for model correction. If for example it is established that the physical model, for a particular material with a particular width, thickness and speed, causes a typical error of 10° C. and a distribution of +/−20° C., the systematic component can be corrected with the downstream statistical model. This so-called statistical model correction can be performed in various ways. One method is to store, in what are known as inheritance tables, correction factors in material class, width class, temperature class and thickness class compartments etc. However this model reaches its limits if a greater number of input parameters is to be covered. For example if one has ten input variables and would like to form ten time intervals for each input variable, this produces 10 billion compartments of which only a small part will be filled in the lifecycle of the system. The lower the production is, the greater will be the number of empty compartments, which means that for production of a product with new parameter values the likelihood is great that there will not yet be any filled compartment, i.e. not yet any correction factor present for it and the statistical modeling thus comes to nothing.

A further method for generating a statistical model is neuronal networks. These are trained with the influencing variables as input and the desired correction factor as output. Since the neuronal network represents the correction factor as a constant function of the influencing variables, it is not possible to exclude the possibility, even with the inclusion of a neuronal networks, of a systematic error remaining with particular materials. A further disadvantage of neuronal networks is that they have to be comprehensively trained before they function in a useable way, i.e. a large number of strips have to be cooled before the neuronal network is ready for use. Until the training is completed there are no correction factors available.

SUMMARY OF INVENTION

The object of the invention is thus to create a simple statistical model to determine a correction factor for an industrial process.

This object is achieved by a method for open-loop and closed loop controlling of an industrial process for manufacturing or processing a product, where control is based on a physical model of the industrial process and for optimizing the control at least one correction factor (K) will be determined statistically in accordance with the following procedural steps:

1. For finished products, the parameters of the physical model including at least one correction factor are stored as product data records,
2. For each production or processing of a new product the stored product data records are compared with the parameters of the new product and product data records similar to the new product data record are determined,
3. From the correction factors of the similar product data records, at least one new correction factor is determined for the new data record during the manufacturing of the new product.

The method can also be used for the case of adaptation with a number of correction factors. This then produces a correction vector, in which case each component of this vector is valid for a subsection of the cooling line for example.

Advantageously the product data records are simply stored chronologically. In this case a ring buffer can be used as a memory. The particular advantage of this method of storage lies in the fact that the old data records are not stored any longer. If for example the storage location is large enough to accommodate a whole year's production of a strip line of a hot-rolling mill, it is then possible to work from the assumption that the production technology parameters of the industrial process have changed so much through aging, conversions etc. that the old production data records no longer contain reliable correction factors, so that not taking account of these old data records at least does not lead to worse results.

A further advantageous embodiment of the invention is provided by a method in which the new correction factor is determined by linear regression from the correction factors of the similar product data records. The new correction factor can be determined with this simple statistical method with a very short computing time.

It is especially advantageous if the previous correction factors are weighted for determining the new correction factor. The weighting can be undertaken here in accordance with the chronological sequence of the entered product data records with their associated correction factors in each case. This means that more recent correction factors are more heavily weighted than older ones. This allows negative influences, for example through ageing of the manufacturing or processing line—as described above—to be greatly reduced.

BRIEF DESCRIPTION OF THE DRAWINGS

An exemplary embodiment of the invention is explained in more detail below on the basis of the drawing. The diagrams show:

FIG. 9 a diagram for determining the new correction factor (K0).

DETAILED DESCRIPTION OF INVENTION

Figure 1:
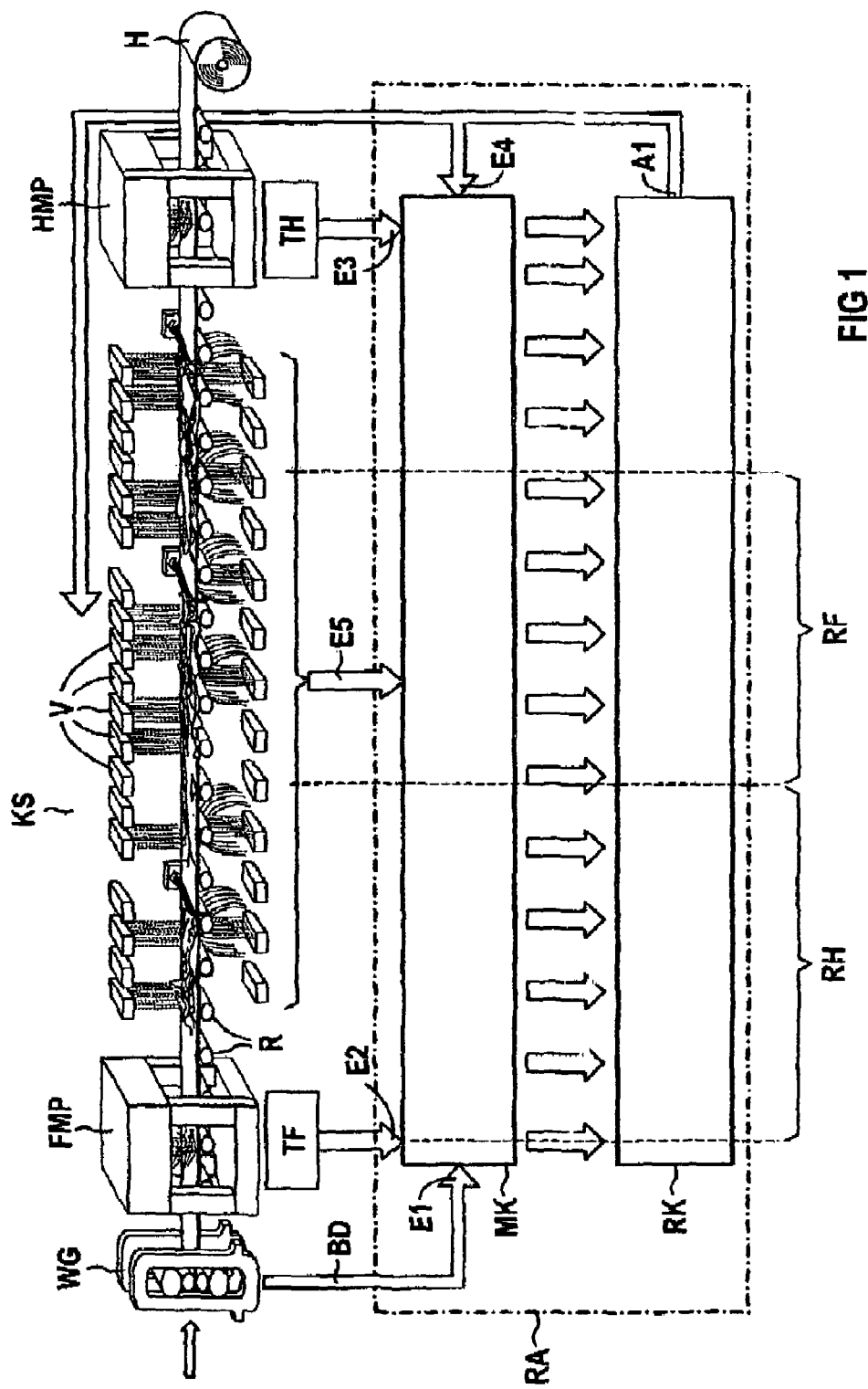
FIG. 1 a schematic diagram of a cooling line of a hot-rolling mill including a simplified block diagram of the associated physical model.

The schematic diagram in accordance with FIG. 1 shows a cooling line of a hot-rolling mill including a simplified block diagram of the associated physical model. The metal strip—coming from the left in the direction of the arrow—passes through the last roller frame WG and is rolled to its final thickness there. Subsequently it passes through the production line measuring station FMP, in which the parameters such as thickness D, temperature at the production line measuring station TF, width of the metal strip B etc. will be measured. The metal strip then passes through the cooling line KS, in which it is carried on rollers R. Valve units V are positioned above and below the metal strip in the cooling line via the valves of which water is sprayed onto the metal strip. After cooling in the cooling line KS the strip passes through the coiler measuring station HMP and is then wound onto a coiler H. Temperatures cannot normally be measured in the cooling line KS.

In the block diagram of the control line RA the cooling line is emulated by a physical model MK of the cooling line. This physical model MK of the cooling line generates the control parameters for the controller RK of the cooling line and computes for any given point of the strip line the temperature of the metal strip. This is indicated by the arrows which can be seen between the model MK of the cooling line and the controller RK of the cooling line. The controller RK of the cooling line is divided up into a controller RH for the main cooling zone and a controller RF for the fine cooling zone.

The physical model of the cooling line obtains the strip data BD or strip parameters via the input E1. Via input E2 it obtains least the temperature TF measured at the production line measuring station FMP. Via input E3 the coiler temperature TH is transferred to the model MK of the cooling line. Further measured values, e.g. strip speed and amount of water applied, are fed to the model via input E5.

As already described, the model MK of the cooling line calculates the temperatures at any given point of the metal strip, relative to its length, so that the controller RK of the fine cooling zone has these temperatures available as actual values for its controlling. The controller now calculates the threshold values for the valve V and transfers these values via its output A1 to the valve V. The valve states are simultaneously given via input E5 to the model MK of the cooling line.

With this control arrangement RA it would be possible, under ideal conditions and if the compositions of the hot-rolled metal strip to be cooled were always the same, to achieve a sensible cooling process, so that the metal strip has the desired temperature before being wound onto the coiler H. However these ideal circumstances are not reflected in real operation. The result of this is that the coiler temperature TH would deviate from the temperature desired and specified as the required value via the control line. Therefore a correction factor K is calculated by the model of the cooling line, via which the deviation between ideal temperature circumstances and real measured temperature circumstances is to be minimized. This correction factor K is continuously calculated and adjusted for the entire time that a metal strip is passing through the cooling line. Once the entire metal strip has passed through the line and been wound onto the coiler H the optimum correction factor K is defined for this metal strip.

The correction factor is thus assigned very much individually to the product data record PDk of a strip. These production data records PD1 to PDn of metal strips already produced are stored in tabular form in a ring buffer. The table below shows typical examples of the production data records PD1 to PDn in tabular form.

TABLE 1

| PD1 | D1 | B1 | V1 | TH1 | TF1 | C1 | Cu1 | Si1 | K1 |
| PD2 | D2 | B2 | V2 | TH2 | TF2 | C2 | Cu2 | Si2 | K2 |
| PD3 | D3 | B3 | V3 | TH3 | TF3 | C3 | Cu3 | Si3 | K3 |
| . | | | | | | | | | |
| . | | | | | | | | | |
| PDn | Dn | Bn | Vn | THn | TFn | Cn | Cun | Sin | Kn |

Stored as parameters for example for product data record PD1 are the thickness D1, width B1, speed V1, coiler temperature TH1, the temperature of the production line measuring station TF1 as well as the chemical components. The chemical components for example include the carbon content C1, the copper content Cu1, the silicon content Si1, etc. (not all components are listed in the table).

Figure 2:
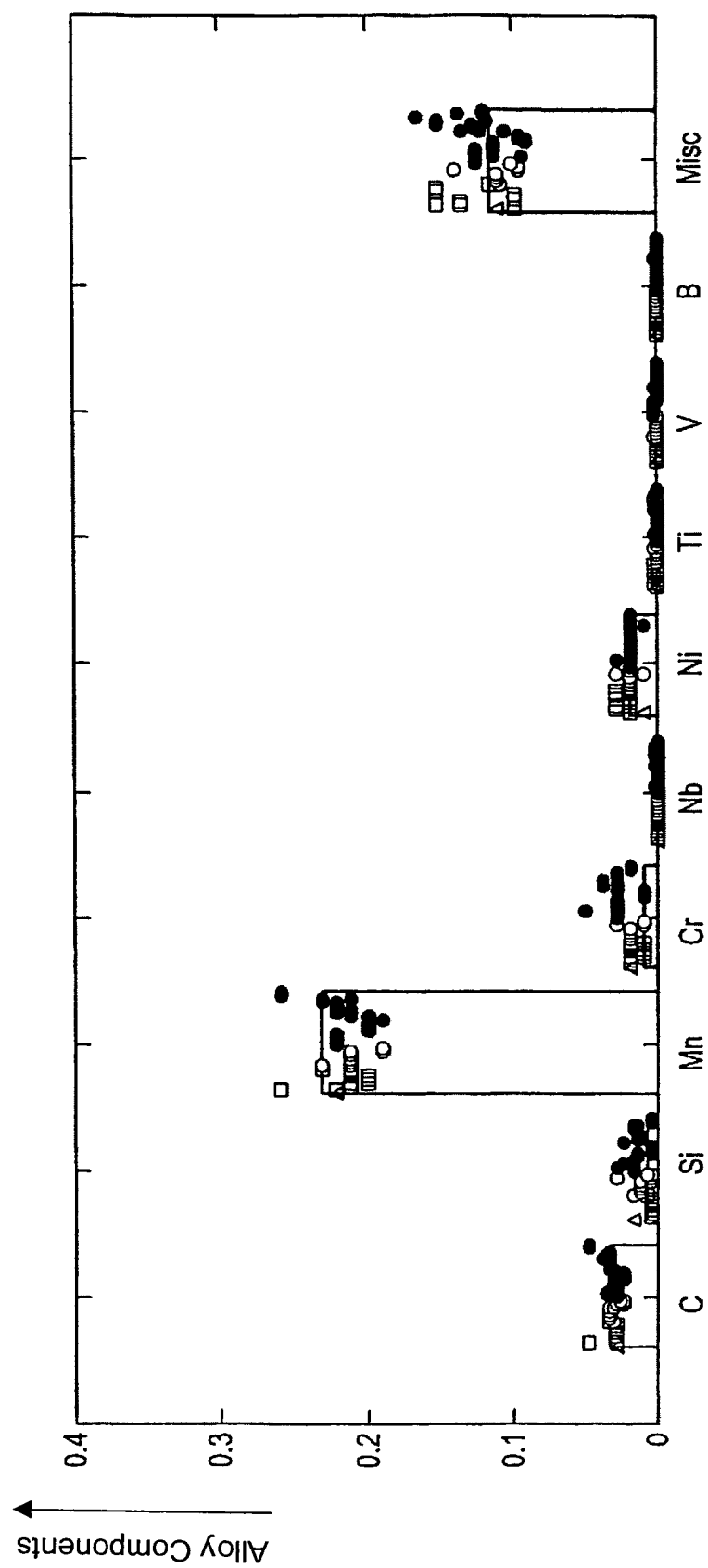
FIG. 2 a diagram of the chemical composition of metal strips.

The bars of the diagram shown in FIG. 2 show the chemical composition of a new metal strip to be rolled. Individually the alloy components of the chemical elements are as follows: Carbon C=0.02, Silicon Si=0.01, Manganese Mn=0.22, Chrome Cr=0.01, Niobium Nb=0, Nickel Ni=0.02, Titanium Ti=0, Vanadium V=0, Boron B=0 and the sum of the remaining alloy components Misc=0.11.

Figure 3:
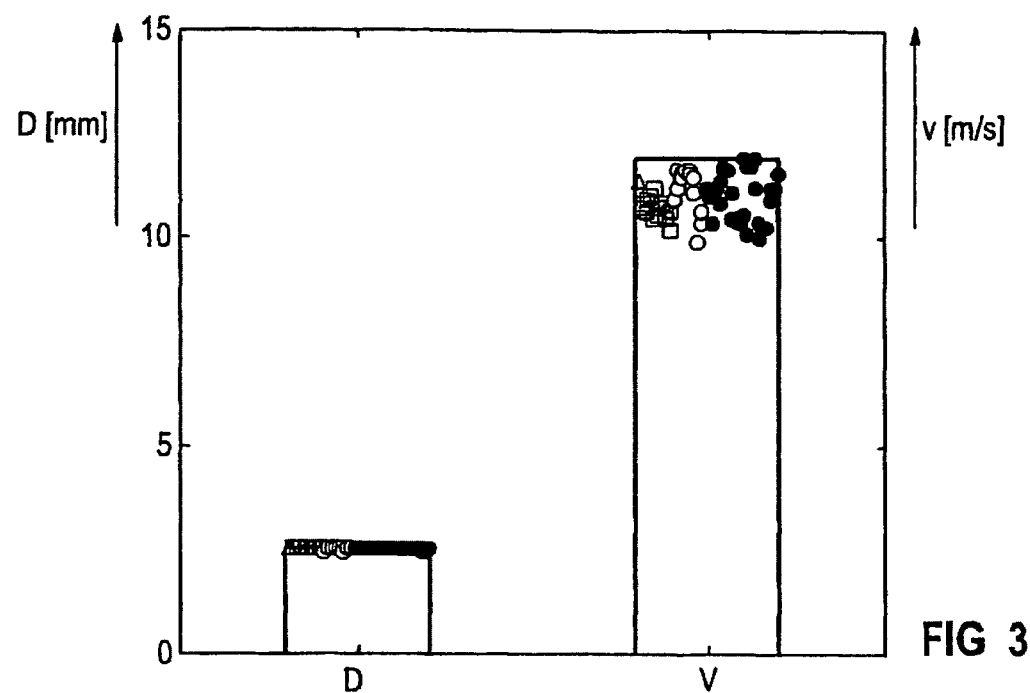
FIG. 3 a diagram of the speed (v[m/s]) and thickness (D[mm]) of metal strips.
Figure 4:
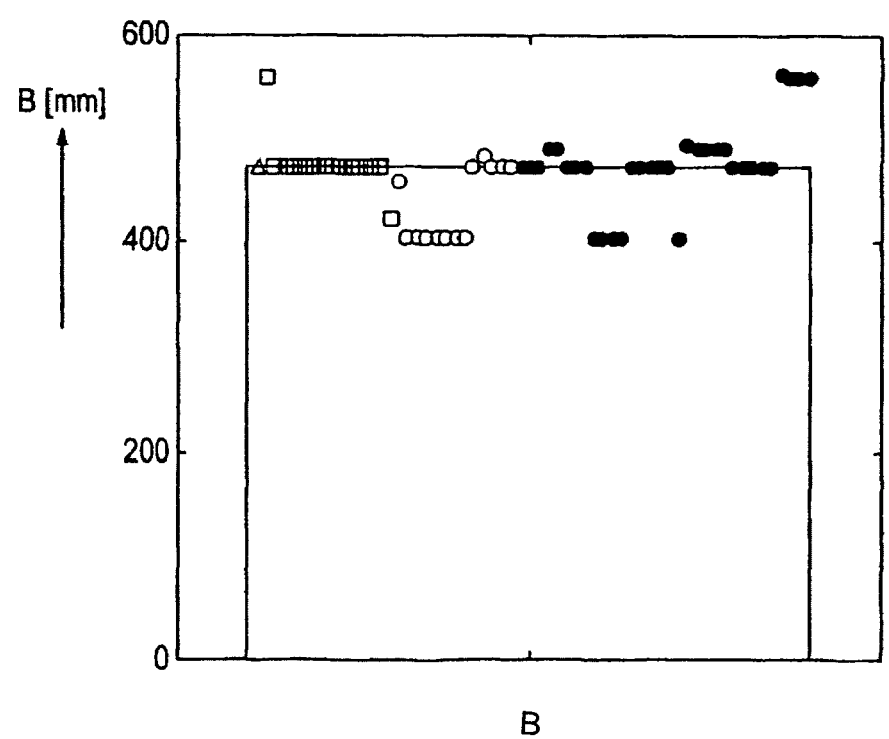
FIG. 4 a diagram of the width (B[mm]) of metal strips.
Figure 5:
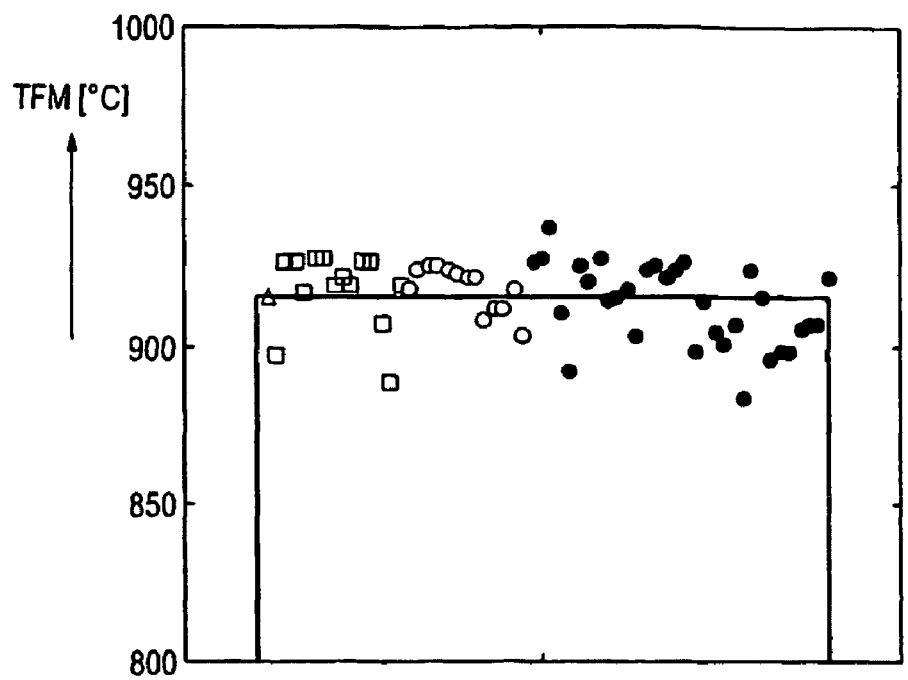
FIG. 5 a diagram of the temperature (TFM[° C.]) of the metal strips at the production line measuring station.
Figure 6:
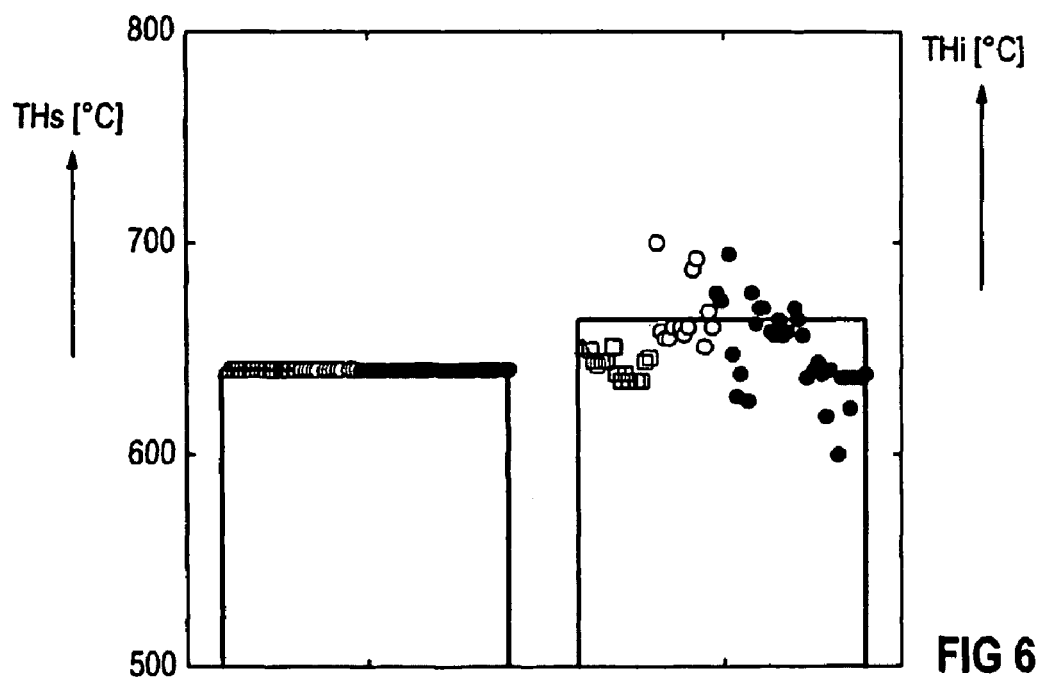
FIG. 6 a diagram of the required coiler temperature (THS[° C.])

The bar diagram in accordance with FIG. 3 shows the desired thickness D in millimeters as well as the speed of the rolling process V in meters per second; The bar diagram in FIG. 4 shows the width B in millimeters and finally, in the diagrams of FIGS. 5 and 6 the desired temperature at the production line measurement station TFM as well as the required coiler temperature THs and the actual coiler temperature THi are shown.

The new strip is now to be manufactured with the parameters shown in the bar diagrams of FIGS. 2 to 6.

(The geometrical shapes drawn in on the bar diagrams of FIGS. 2 to 6—circles, points, rectangles and triangles, will be discussed in greater detail below.)

A correction factor K must now be determined for the new metal strip to be rolled. This will be explained in more detail below on the basis of FIG. 7.

Figure 7:
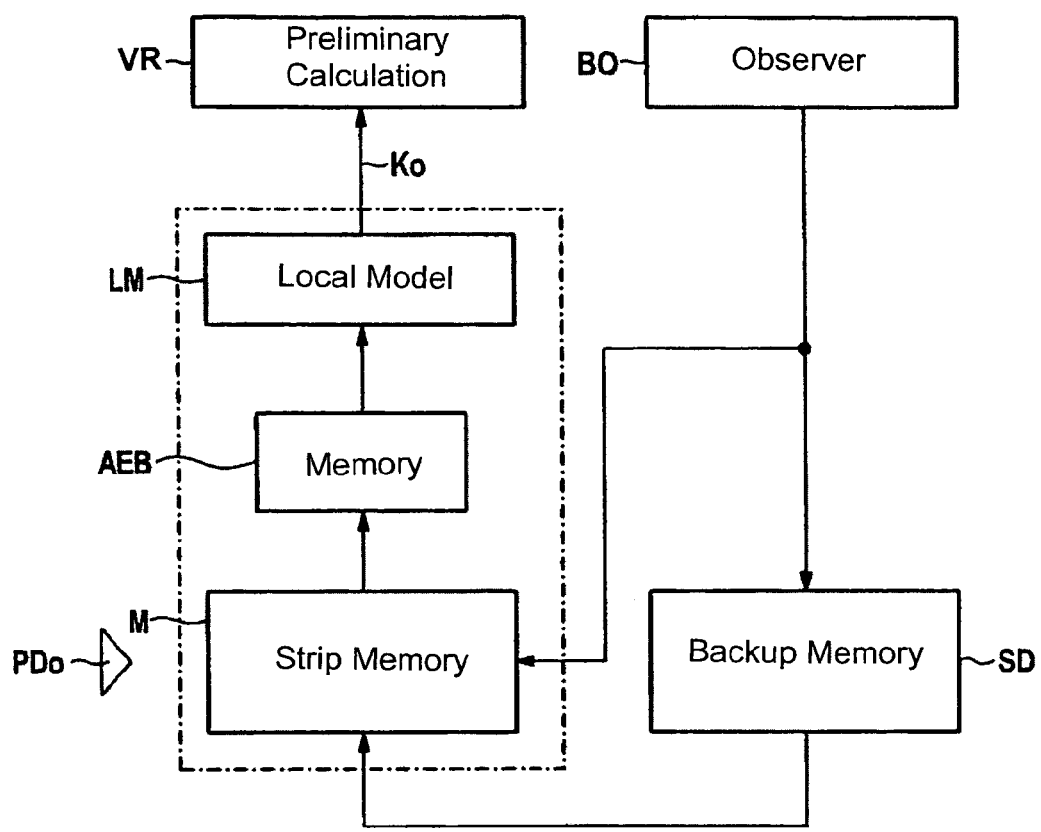
FIG. 7 a block diagram for determining a correction factor (K)

FIG. 7 shows a block diagram of a device for determining a correction factor K for a new strip. It consists of an observer BO of which the output is connected to a strip memory M and a backup memory SD. The backup memory SD serves to save the data records for the case where the data is lost in the strip memory M, because of a computer failure for example. The strip memory M can be loaded on program start via the output of backup memory SD.

Strip memory M contains the product data records PD1 to PDn of all strips already manufactured or at least of a large number of strips already manufactured. For example the strip memory M can be a ring buffer containing the data of 100,000 strips. These strips are stored in the order in which they were rolled, i.e. they are stored chronologically. The storage space required amounts to around 20 Megabytes.

On the basis of the primary data of the new strip to be manufactured for which a data record in accordance with Table 2 below exists

TABLE 2

| PD0 | D0 | B0 | V0 | TH0 | TF0 | C0 | Cu0 | Si0 | K0 |
| --- | --- | --- | --- | --- | --- | --- | --- | --- | --- |

(where the value for K0 is not yet known, since the strip has not yet been cooled) similar data records are now determined from the product data records now found in the strip memory M (see Table 1) PD1 to PDn, e.g. in accordance with the following rule:

$$a^2 := c1(D-D0)^2 + c2 \cdot (B-B0)^2 + c3(TH-TH0)^2 + \ldots$$

Here c1, c2, c3, ..., stand for positive, real-value constants.

If $a^2 < 1$, then the data record is a similar data record; if $a^2$ is not $<1$, then the data record is not similar and the data record is not included for further calculation of the correction factor.

In accordance withe these calculation rules, 20 parameters produce 40 multiplications and 20 additions for example, in which case it is easy to see that the comparison with one of the product data records PD1 to PDn can already be aborted at the point at which a product $>1$, so that considerable computing time can be saved here. The constants C1, C2, C3, etc. are used to standardize the individual summands.

In this way all product data records PD1 to PDn similar to the primary data PD0 of the new strip to be manufactured are determined and stored in memory AEB (FIG. 7). The values of this data are reflected in the form or circles, points, rectangles and triangles in the bar diagrams of FIGS. 2 to 6. In this case the different geometrical figures describe the different age of the product data records determined. As can be seen, the product data records determined are actually similar to the new product data record PD0 since they lie at the bar height of the diagrams.

In accordance with FIG. 7 a local model LM is now initially formed from the similar product data records PD1 to PDn of the similar strips. This can be done for example by applying the known technique of linear regression. A correction factor K0 is thus formed for the new metal strip to be cooled by using the primary data record PD0 in the linear model LM. This will be explained on the basis of FIG. 9. First however an advantageous intermediate step will be described.

Before the final calculation of the new correction factor K0 it makes sense to weight the similar strips found, i.e. the similar product data records PD1 to PDn found.

Figure 8:
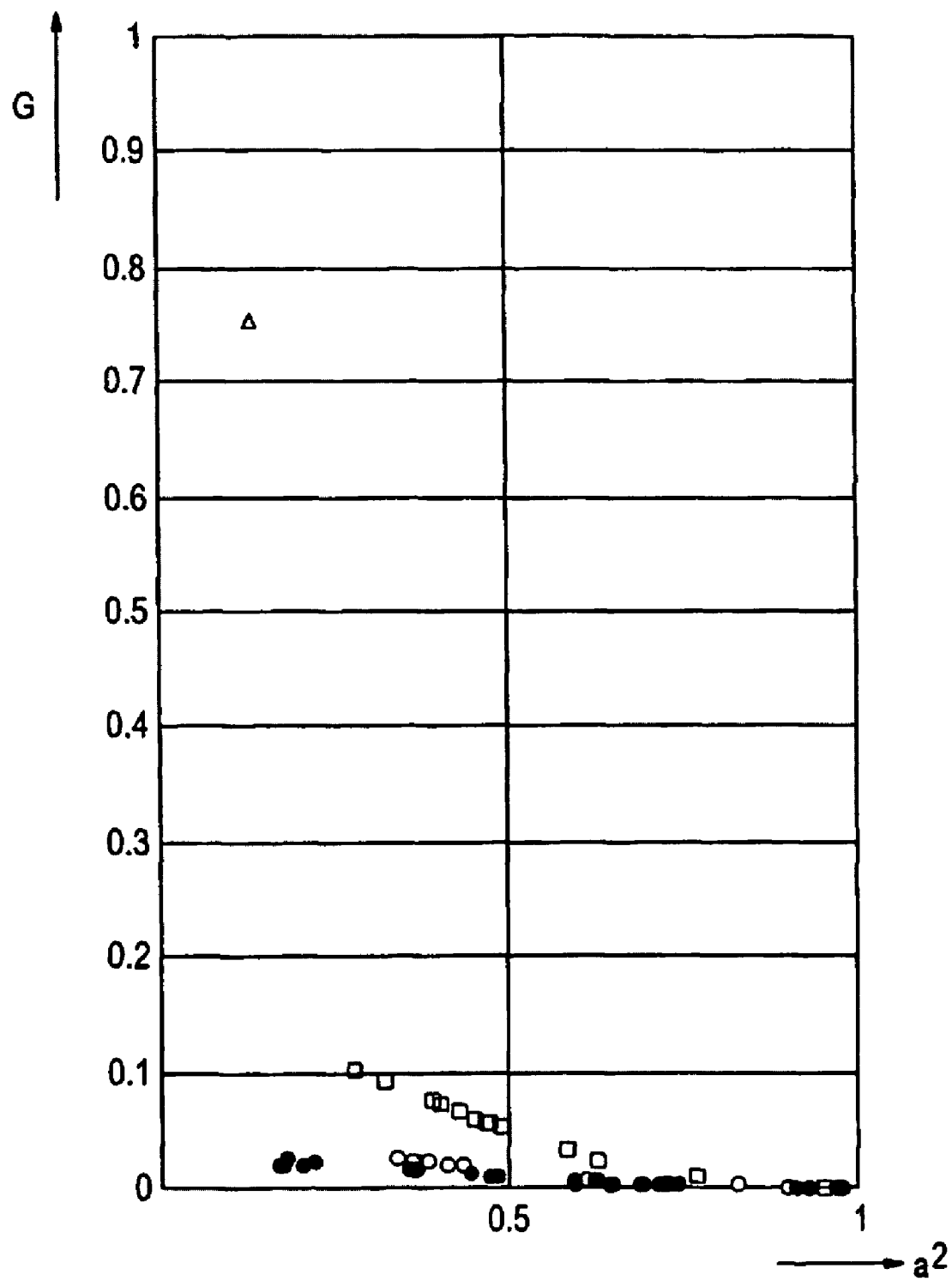
FIG. 8 a diagram for weighting (G) the correction factors.

This weighting is illustrated in the diagram shown in FIG. 8. On the horizontal axis in this diagram the distance of the strips $a^2$, which was found using the calculation rules demonstrated above, is specified. Strips with $a^2=1$ are no longer recorded here. Strips which have a greater distance up to a maximum of around=1 are weighted very little. In the diagram shown here these strips have a weighting of 0 or near 0. As can be seen, the weighting increases as the distance $a^2$ decreases.

Also in the diagram in FIG. 8 the age of the strips (corresponding to the date of production) is identified by different geometrical symbols, in the order recent to old. Δ, □, circle, point. The single strip with the triangle symbol is thus the most recent strip, which as can be seen, has the highest weighting, namely 0.75.

In the diagram in FIG. 9 the adjusted correction factor K is shown on the horizontal axis in each case and the correction factor KA approximated by means of linear regression is shown on the vertical axis.

If the linear model LM were to ideally emulate the adjusted correction factors contained in the data records of the similar strips, the correction factor KA calculated by means of the linear model would be equal to the adjusted correction factor K and thus the correction factor would lie on the bisector of the angle. Since this is not the case, the values of the correction factor are scattered, as shown in FIG. 9. One can detect from this how precisely the linear model LM describes the similar product data records PD0 to PDn. In the diagram in accordance with FIG. 9 a further straight line G1 is shown in with the inclination 2. A sector S1 extends between this straight line G1 and a horizontal line G2.

Each point lying within the sector S1 is better emulated by the linear model LM than if the adaptation had been dispensed with immediately, i.e., approximation were to be with the correction factor K=1. The converse applies for behavior for all points which do not lie in the sector S1 and also not in the opposite injector S2 (to which the same applies as for sector S1). Thus an estimation can be taken from the said diagram of how good the adaptation is now for the strip to be cooled. For this there is not yet any adjusted correction factor available since it has not yet been cooled. Use of the associated product data record PD0 in the linear model LM supplies and estimated value K0 for the correction factor K0 which is then applied for the later cooling. The result is drawn in as horizontal dashed line H1 in FIG. 9. After cooling of the strip an adjusted correction factor K0 is known. FIG. 9 shows the corresponding result as vertical line V1. The intersection point P between the horizontal line H1 and the vertical line V1 now shows retrospectively the quality of the adaptation for the cooled strip. If point P lies within S1 or S2 the adaptation was successful. If it lies outside, cooling without adaptation would have been better.

After the estimated value K0 has now been found, this will now be entered along with the other product data PD0 into the preliminary calculation VR (FIG. 7) and the strip is cooled with these parameter values and with the estimated value found K0, in which case fine tuning of the correction factor K0 is undertaken here too via the observer B. This finally produces the stored correction factor K0.

With today's data processing systems the computing time required to search for similar strips from a meat data record with 100,000 strips is approx. ¹/₁₀th second, the computing time for determining the correction factor K0 from the similar strips by means of linear regression is around 0.02 seconds, so that the new correction factor K0 is already securely calculated when the strip has left the last roller frame (WG in FIG. 1).

The invention claimed is:

1. A method for controlling an industrial process for manufacturing or processing of a product, wherein the controlling is based on a physical model of the industrial process, and wherein, to optimize the controlling, at least one correction factor is determined in accordance with the following steps:

storing parameters of finished products and at least one correction factor as product data records;

comparing for each manufacturing or processing of a new product, the stored product data records with parameters of the new product which build a new product data record;

determining similar product data records; and determining from correction factors of the similar product data records during the manufacturing of the new product at least one new correction factor for the new product data record, wherein, to determine the new correction factor a model is determined beforehand, in which, by using the new product data record the new correction factor can be calculated.

2. The method in accordance with claim 1, wherein the model is a linear model.

3. The method in accordance with claim 2, wherein the correction factors are weighted to determine the new correction factor.

4. The method in accordance with claim 2, wherein the industrial process is subject to additional closed loop control.

5. The method in accordance with claim 1, wherein the product data records are stored chronologically.

6. The method in accordance with claim 5, wherein the industrial process is subject to additional closed loop control.

7. The method in accordance with claim 1, wherein the correction factors are weighted to determine the new correction factor.

8. The method in accordance with claim 7, wherein chronologically more recent correction factors are weighted more heavily than chronologically older factors.

9. The method in accordance with claim 7, wherein the correction factors are weighted more heavily the more similar they are.

10. The method in accordance with claim 7, wherein the industrial process is subject to additional closed loop control.

11. The method in accordance with claim 1, wherein the industrial process is subject to additional closed loop control.

12. The method in accordance with claim 1, wherein the industrial process is a cooling line of a hot-rolling mill.

13. A method for open-loop and closed-loop controlling of an industrial process for manufacturing or processing of a product wherein control is based on a physical model of the industrial process and wherein, to optimize the control, at least one correction factor is determined in accordance with the following procedural steps:

for finished products parameters including at least one correction factor are stored as product data records;

for each manufacturing or processing of a new product the stored product data records are compared with parameters of the new product and similar product data records are determined; and from correction factors of the similar product data records, during the manufacturing of the new product at least one new correction factor is determined for parameters of the new product data record, wherein the parameters of the new product data record are used for optimizing the open-loop or respectively the closed-loop controlling, wherein, to determine the correction factor a model is determined beforehand, in which, by using the parameters of the new product data record the correction factor is calculated, and wherein the model is a linear model.

14. A method for controlling an industrial process for manufacturing or processing of a product, wherein the controlling is based on a physical model of the industrial process, and wherein, to optimize the controlling, at least one correction factor is determined in accordance with the following steps:

storing parameters of finished products and at least one correction factor as product data records;

comparing for each manufacturing or processing of a new product, the stored product data records with parameters of the new product which build a new product data record;

determining similar product data records; and determining from correction factors of the similar product data records during the manufacturing of the new product at least one new correction factor for the new product data record, wherein the product data records are stored in a ring buffer.

15. A method for controlling an industrial process for manufacturing or processing of a product, wherein the controlling is based on a physical model of the industrial process, and wherein, to optimize the controlling, at least one correction factor is determined in accordance with the following steps:

storing parameters of finished products and at least one correction factor as product data records;

comparing for each manufacturing or processing of a new product the stored product data records with parameters of the new product which build a new product data record;

determining similar product data records; and determining from correction factors of the similar product data records during the manufacturing of the new product at least one new correction factor for the new product data record, wherein the similar product data records are determined in accordance with the following rule:

$$a^2 = \sum_{n}^{k} c_n (par_n - par_{no})^2$$

wherein, if $a^2 < 1$, then there this is a similar data record, wherein $c_n$ stands for a positive, real-value constant, wherein $par_n$ is a parameter of a stored product, and wherein $par_{no}$ is a parameter of a new product.

16. The method in accordance with claim 3, wherein the at least one correction factor is individually assigned to a product data record.

* * * * *